(12) United States Patent
Bryan et al.

(10) Patent No.: US 8,056,508 B1
(45) Date of Patent: Nov. 15, 2011

(54) SYRINGE FEEDER WITH NIPPLE AND GUARD

(76) Inventors: Paige Bryan, Milton, FL (US); Mark Bryan, Milton, FL (US)

( * ) Notice: Subject to any disclaimer, the term of this patent is extended or adjusted under 35 U.S.C. 154(b) by 152 days.

(21) Appl. No.: 12/653,647

(22) Filed: Dec. 17, 2009

(51) Int. Cl.
*A01K 7/00* (2006.01)
*A01K 9/00* (2006.01)

(52) U.S. Cl. ............................. 119/71; 119/72
(58) Field of Classification Search .......... 119/71, 119/51.11, 51.5, 51.01, 72, 72.5; 604/187, 604/192, 197, 268; *A01K 1/10, 5/00, 39/00, A01K 9/00, 7/00*
See application file for complete search history.

(56) References Cited

U.S. PATENT DOCUMENTS

| | | | |
|---|---|---|---|
| 2,680,441 A | 6/1954 | Krammer | |
| 3,982,357 A * | 9/1976 | Eldridge et al. | 451/461 |
| 4,821,895 A | 4/1989 | Roskilly | |
| 5,279,577 A * | 1/1994 | Collett | 604/192 |
| 5,431,680 A | 7/1995 | Jones | |
| 5,487,750 A | 1/1996 | Burchett et al. | |
| D372,089 S | 7/1996 | Sheu | |
| 5,554,116 A | 9/1996 | Fu-Hsiang | |
| D377,830 S | 2/1997 | Lai | |
| 5,824,012 A | 10/1998 | Burchett et al. | |
| 5,843,030 A * | 12/1998 | Van Der Merwe | 604/77 |
| 5,891,165 A * | 4/1999 | Buckner | 606/234 |
| D417,275 S | 11/1999 | Conforti | |
| 6,270,519 B1 | 8/2001 | Botts | |
| 6,484,667 B2 * | 11/2002 | Pelletier | 119/72.5 |
| 6,648,857 B1 * | 11/2003 | Pedigo | 604/192 |
| 6,964,078 B2 * | 11/2005 | Schwab | 15/218.1 |
| 2007/0179451 A1 * | 8/2007 | Sprinkle et al. | 604/192 |

* cited by examiner

*Primary Examiner* — David Parsley
*Assistant Examiner* — Thien Thanh Pham
(74) *Attorney, Agent, or Firm* — Peter Loffler

(57) ABSTRACT

A hand feeding system for small animals, such as kittens, uses a syringe that has a nursing nipple removably attached to the hub end of the syringe. Either a scratch pad is interposed directly between a shoulder of the syringe and the nipple or a plate is so interposed such that the plate is removably attached to a freestanding stand that has a scratch pad located thereon.

5 Claims, 3 Drawing Sheets

SYRINGE FEEDER WITH NIPPLE AND GUARD

BACKGROUND OF THE INVENTION

1. Field of the Invention

The present invention relates to a syringe based feeder that has a nipple thereon for feeding small animals such as kittens. The feeder also has a guard for helping prevent the animal's paws from interfering with the feeding process.

2. Background of the Prior Art

Baby animals, such as kittens, are dependent on their mother for just about everything, including nutrition, for survival. Unfortunately, sometimes the baby animal is separated from its mother due to death or incapacitation of the mother, forced separation by man, etc. If the baby animal is separated from its mother, either man intervenes and provides for the baby or the baby, too young and immature to fend for itself, dies.

As mentioned, one of the critical functions that man must perform is to feed the baby animal so that it has sufficient nutrition to sustain itself. Normally, the baby animal latches on to a teat of the mother and drinks the milk produced by the mother. Such mother's milk, also consumed by many other animals including man, generally provides all the nutrients needed by the baby animal in the critical first days and weeks of the baby's life. Of course, man lacks such teats or the ability to produce mother's milk for an animal, therefore, other accommodations must be made. Modern science has produced formulas that closely match and often exceed the nutritional qualities of the mother's milk for a baby kitten or other animal. However, even if a specialized formula is not available, simple milk and cream make a great substitute for the non-available mother's milk.

With a nutritional substitute in hand, the next problem becomes actually feeding the animal with the milk or formula. Baby animals often lack the skills and abilities to feed themselves from a bowl or other food source, such skills and abilities being learned over time. To address this, many baby animal caregivers simply use a syringe for the feeding process. An amount of feeding liquid is drawn into the barrel of the syringe through the tip of the hub with the tip being inserted into the kitten's mouth and the plunger being slowly depressed in order to deliver the liquid into the kitten's mouth. While technically sound, this method of liquid delivery is not particularly efficient due to the fact that the tip of the hub is a rather unnatural element for the kitten and the baby animal is reluctant to have the tip placed into its mouth. As a result, the caregiver must force the tip into the kitten's mouth, oftentimes with great struggle with the animal. Not only can such a struggle lead to a mess with formula or milk all over the place, but the relatively delicate animal can suffer an injury.

To address this issue, nursing nipples have been used which nipples cover the tip of the syringe and allow the kitten to draw the liquid from the syringe through the nipple. As the nipple is more natural to the animal, both aesthetically and texturally, the animal is less resistant to its use and is more likely to latch onto the nipple and "nurse" therefrom. The use of a nipple overlying the cold and clinical hub tip of the syringe vastly improves the efficiency of the baby animal feeding process, however, certain shortcoming still remain. The baby animal, being playful by instinct, uses its front paws to engage the hands of the caregiver during the feeding process. This engagement of the hands of the caregiver by the kitten interferes with the feeding process by making it difficult for the caregiver to maintain the nipple within the animal's mouth. Not only can a mess result, but the animal, although having fun with the caregiver, does not ingest the required amount of sustenance during the feeding cycle. To address this problem, a second caregiver engages the paws of the kitten so that the first caregiver can concentrate on maintaining the nipple within the mouth of the animal. While effective, this method is inefficient in that a second person is needed for each feeding cycle, which can be expensive in a commercial setting such as a veterinarian's office, and possibly difficult to obtain in a private home setting when a person is alone with the kitten.

What is needed is a system whereby a baby animal such as a kitten can be easily and effectively fed via a nipple tipped syringe wherein the playfulness of the animal does not adversely interfere with the feeding process. Specifically, such a system must allow a single person to be able to feed the baby animal and keep the animal's paws engaged on an area other than the caregiver's hands. Ideally, such a system is of relatively simple design and construction so as to be relatively inexpensive to manufacture and obtain.

SUMMARY OF THE INVENTION

The syringe feeder with nipple and guard of the present invention addresses the aforementioned needs in the art by providing a syringe based feeding device for baby animals such as kittens with a feeding nipple overlying the tip of the syringe hub. The syringe feeder with nipple and guard also provides a subsystem that can be engaged by the kitten's paws allowing the kitten to be naturally playful during feeding, which playfulness does not adversely interfere with the feeder's hands so as not to adversely affect the feeding process. The syringe feeder with nipple and guard is of relatively simple design and construction, being made using standard manufacturing techniques, so as to be readily affordable to a large percentage of potential consumers for such a product. The syringe feeder with nipple and guard is relatively easy to use, maintain, and clean.

The syringe feeder with nipple and guard of the present invention is comprised of a syringe that has a barrel and a plunger slidably disposed within the barrel. The barrel has a shoulder on an end thereof and a hub extending outwardly from the shoulder, the hub having a tip with a first opening. A scratch pad has a second opening such that the scratch pad is removably attached to the syringe by passing the tip and the hub through the second opening with the scratch pad abutting against the shoulder of the barrel. A nipple structure has a nipple thereon and is removably attached to the hub of the syringe so that the scratch pad is sandwiched between the nipple structure and the shoulder. The scratch pad may have a rigid backing member. The nipple structure has a cap attached to the nipple such that the cap is either frictionally or threadably attached to the hub. Alternately, a stand is provided that has a forward leg with a front surface and a slot that has a cutaway section. The stand is capable of being freestanding. A scratch pad is removably attached to the front surface of the forward leg. A plate has a second opening such that the plate is removably attached to the syringe by passing the tip and the hub through the second opening such that the plate abuts the shoulder of the barrel. The nipple structure sandwiches the plate between itself and the shoulder of the syringe. The scratch pad is removably attached to the front surface of the forward leg by having a first portion of hook and loop material disposed on the front surface and having a second portion of hook and loop material disposed on scratch pad such that the first portion of hook and loop material and the second portion of hook and loop material cooperatively mate with one another. The stand may also have a support leg for providing the freestanding capability of the stand.

BRIEF DESCRIPTION OF THE DRAWINGS

Similar reference numerals refer to similar parts throughout the several views of the drawings.

DESCRIPTION OF THE PREFERRED EMBODIMENT

Figure 1:
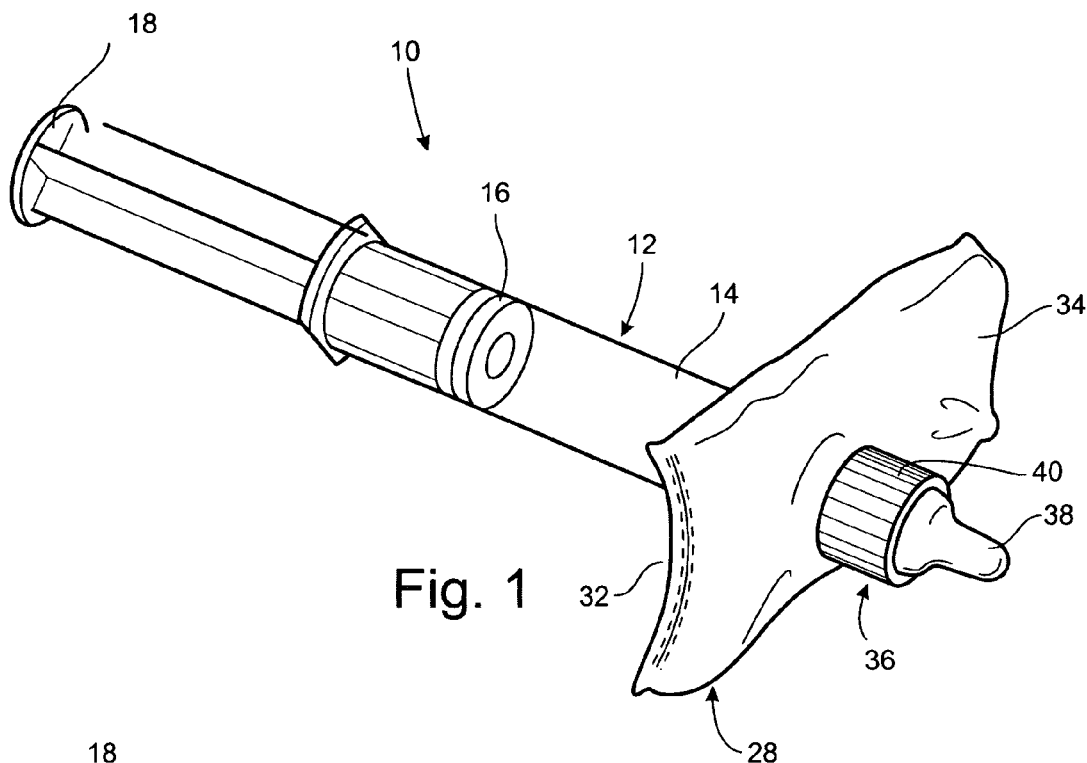
FIG. 1 is a perspective view of the syringe feeder with nipple and guard of the present invention.
Figure 2:
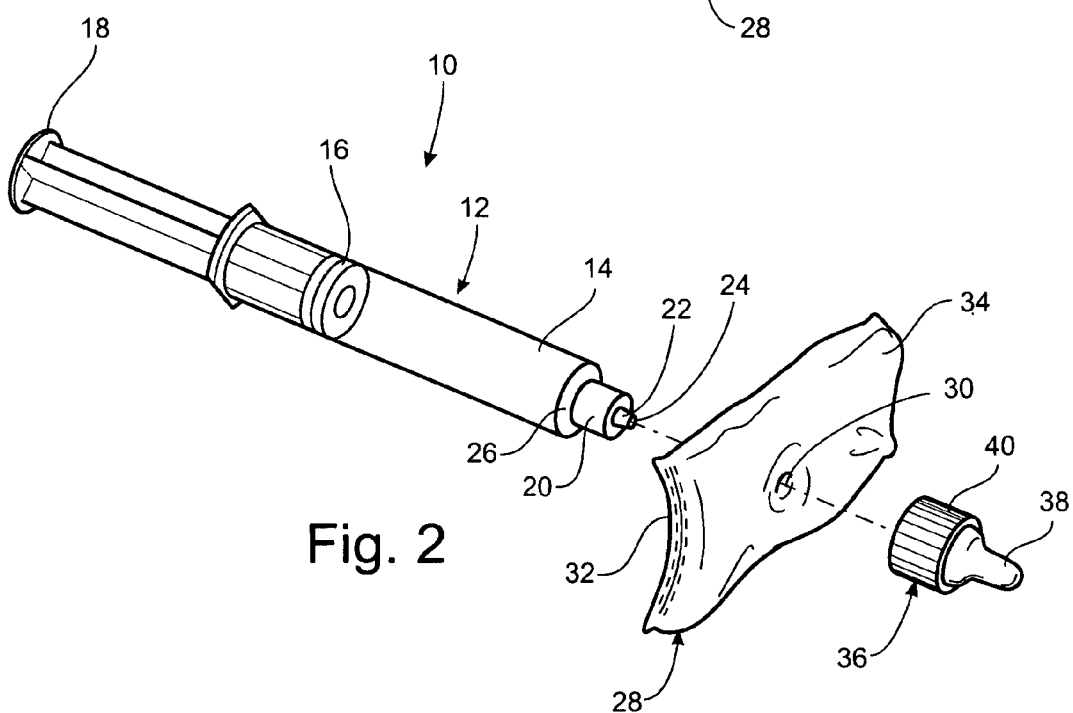
FIG. 2 is a perspective view, partially exploded, of the syringe feeder with nipple and guard of FIG. 1.

Referring now to the drawings, it is seen that the syringe feeder with nipple and guard of the present invention, generally denoted by reference numeral 10, is comprised of a typical syringe 12 having a barrel 14 with a plunger 16 slidably disposed within the barrel 14 and a handle 18 attached to the plunger 16 for controlling movement of the plunger 16 within the barrel 14. A hub 20 has a tip 22 with an opening 24, the hub 20 extending from a shoulder 26 of the barrel 14. The syringe 12 works in the usual way in that the plunger 16 is slid to the hub 20 end of the barrel 14 via the handle 18. The opening 24 of the tip 22 is placed within a desired liquid and the plunger 16 is slid away from the hub 20 via pulling of the handle 18. This rearward sliding of the plunger 16 creates a vacuum within the barrel 14 so that the liquid is drawn into the barrel 14 via the opening 24 of the tip 22 as a result of the vacuum so created. Once the barrel 14 is filled with a desired amount of the liquid, the liquid is extracted from the barrel 14 by pressing on the handle 18 so as to push the plunger 16 toward the hub 20 end of the barrel 14 thereby forcing the liquid back out of the opening 24 of the tip.

As seen, a guard 28 has a central opening 30, a relatively rigid backing 32 (although not required), and a relatively soft scratch pad 34. The scratch pad 34 may be of any appropriate scratch pad material such asm by way of example, foam or similar soft material covered in an appropriate cover such as cloth, leather, Nylon, etc., or other appropriate covering material, the overall guard 28 acting as a scratching pad for a kitten or other baby animal. If a backing 32 is used, the covering material may be removable therefrom for ease of cleaning of the scratch pad 34. The guard 28 is fitted on the syringe 12 by passing the hub 20 through the opening 30 on the guard 28. The back of the guard 28 buts up against and seats on the shoulder 26 of the syringe 12. The guard 28 is maintained on the syringe 12 by attaching a nipple structure 36, having a nursing nipple 38 and a cap 40, onto the hub 20 of the syringe 12 so as to sandwich the guard 28 onto the syringe 12. The cap 40 has a diameter that is greater than the diameter of the opening 30 of the guard 28 so as to prevent the guard 28 from slipping off of the syringe 12. The nipple structure 36 is maintained on the hub 20 of the syringe in any appropriate fashion, including having the cap 40 of the nipple structure 36 be threadably attached to the hub 20 (threading on hub 20 not illustrated) or by having the cap 40 frictionally fit onto the hub 20, etc. The size of the syringe 12 and the attached nipple 38 of the nipple structure 36 is selected based on the size of the animal being fed using the device 10.

In order to use the syringe feeder with nipple and guard 10 of the present invention, the syringe 12 is filled with a desired liquid, such as formula or cream. The guard 28 is attached to the syringe 12 and the nipple structure 36 is attached to the syringe 12 so as to maintain the guard 28 in place. The device 10 is now ready for use. The kitten is fed the liquid within the syringe 12 via the nipple 38 of the nipple structure 36. The baby animal is able to scratch on or otherwise play with the scratch pad 34 of the guard 28 so as not to interfere with the hands of the feeder.

Figure 3:
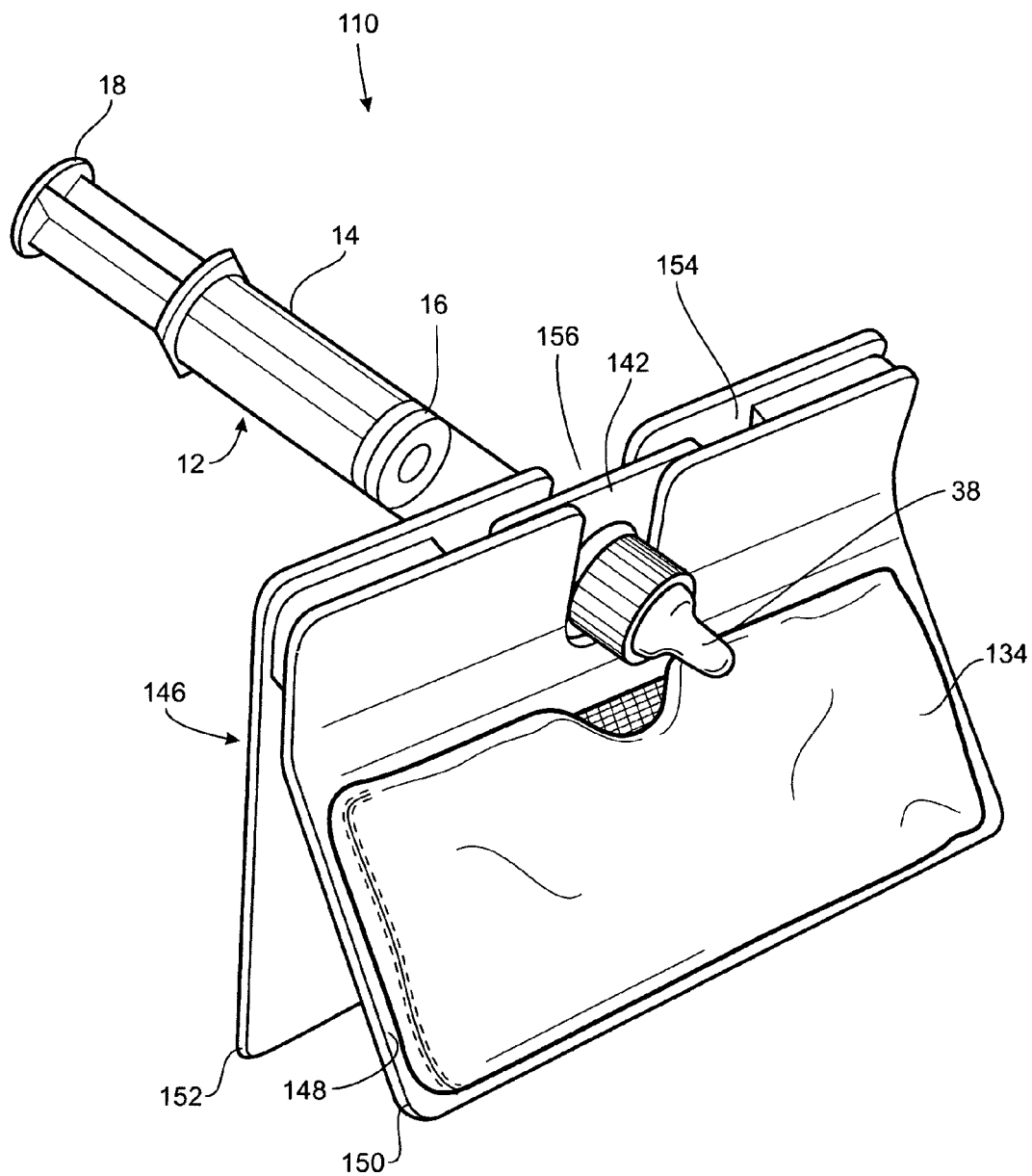
FIG. 3 is a perspective view of an alternate configuration of the syringe feeder with nipple and guard of the present invention.
Figure 4:
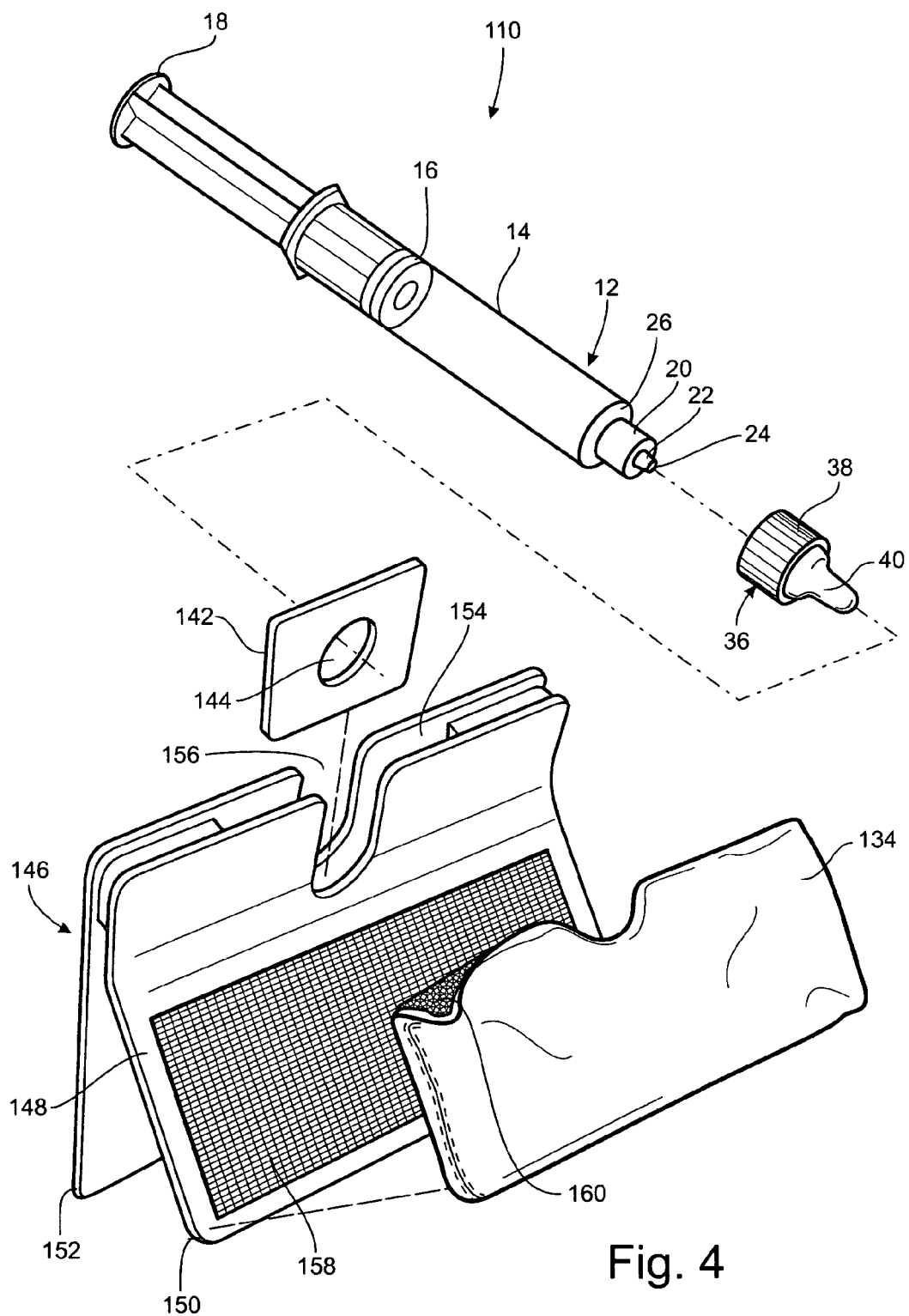
FIG. 4 is a perspective view, partially exploded, of the syringe feeder with nipple and guard of FIG. 3.

As seen in FIGS. 3 and 4, in an alternate embodiment of the syringe feeder with nipple and guard 110, a plate 142 has a central opening 144 which central opening 144 is fitted over the hub 20 of the syringe 12. The nipple structure 36 holds the plate 142 in the usual way as described for the first embodiment of the syringe feeder with nipple and guard 10. A stand 146 has a front face 148 located on a forward leg 150 thereof, a support leg 152, and a slot 154 with a cutaway portion 156. A scratch pad 134 is removably attached to the front face 148 of the stand 146. The scratch pad 134 is made in similar fashion to the previously described scratch pad 34 such as foam or similar material covered in an appropriate cover such as cloth, leather, Nylon, etc., or other appropriate covering material and acts as a scratching pad for a kitten or other baby animal. The removable attachment of the scratch pad 134 to the front face 148 of the stand 146 may be by any appropriate means known including the use of a first portion 158 of cooperating hook and loop material (which includes the new cooperating hook and pile material) attached on the underside of the scratch pad 134 and a corresponding second portion 160 of cooperating hook and loop material attached to the front face 148 of the stand 146 so that the first portion 158 of hook and loop material cooperatively mates with the second portion 160 of hook and loop material in order to attach the scratch pad 134 to the front face 148 of the stand 146. The forward leg 150 and the support leg 152 act together to make the stand 146 freestanding. Of course other architectures can be used to make the stand 146 freestanding. For example, the forward leg 150 may have a horizontally extending support (not illustrated) which support holds the stand 146 upright without the need for a support leg.

In order to use this embodiment of the syringe feeder with nipple and guard 110 of the present invention, the syringe 12 is filled with a desired liquid, such as formula or cream. The plate 142 is attached to the syringe 12 and the nipple structure 36 is attached to the syringe 12 so as to maintain the plate 142 in place. The scratch pad 134 is attached to the front face 148 of the stand 146. The plate 142 is slid into the slot 154 at the top of the stand 146 so that the plate's opening 144—and the held syringe 12—is within the cutaway portion 156. The syringe 12 is now held in place attached to the stand 146. The kitten may now feed from the device 110 as desired. The baby animal is able to scratch on or otherwise play with the scratch pad 134 attached to the stand 146 so as not to interfere with the hands of the feeder. If the animal is sufficiently strong so as to be able to suck liquid out of the syringe without the need for a caregiver to depress the plunger 16, the animal may be left unattended with this embodiment of the syringe feeder with nipple and guard 110. When feeding is over, the plate 142 and its held syringe 12 are slid out of the slot 154, the nipple structure 36 is removed from the hub 20 and thereafter the plate 142 is removed from the hub 20. The syringe 12 is refilled, cleaned, or otherwise disposed of as needed. The scratch pad 134 may be removed from the front face 148 of the stand 146 in order to be cleaned or replaced as needed.

While the invention has been particularly shown and described with reference to embodiments thereof, it will be appreciated by those skilled in the art that various changes in form and detail may be made without departing from the spirit and scope of the invention.

We claim:

1. A feeding system comprising:
   a syringe having a barrel with a plunger slidably disposed within the barrel, the barrel having a shoulder on an end thereof, the syringe also having a hub extending from the shoulder with a tip extending from the hub, the tip having a first opening;
   a stand having a forward leg with a front surface and a slot with a cutaway section, the stand capable of being freestanding;
   a scratch pad removably attached to the front surface of the forward leg;
   a plate having a second opening such that the plate is removably attached to the syringe by passing the tip and the hub through the second opening with the plate abutting the shoulder of the barrel;
   a nipple structure having a nipple thereon removably attached to the hub of the syringe so that the plate is sandwiched between the nipple structure and the shoulder; wherein said syringe with said plate being removably placed within the cutaway section of the stand such that the scratch pad on the forward leg faces the same direction as the nipple.

2. The feeding system as in claim 1 wherein the nipple structure further comprises a cap attached to the nipple such that the cap is either frictionally or threadably attached to the hub.

3. The feeding system as in claim 2 wherein the scratch pad is removably attached to the front surface of the forward leg by having a first portion of hook and loop material disposed on the front surface and having a second portion of hook and loop material disposed on the scratch pad such that the first portion of hook and loop material and the second portion of hook and loop material cooperatively mate with one another.

4. The feeding system as in claim 1 wherein the scratch pad is removably attached to the front surface of the forward leg by having a first portion of hook and loop material disposed on the front surface and having a second portion of hook and loop material disposed on the scratch pad such that the first portion of hook and loop material and the second portion of hook and loop material cooperatively mate with one another.

5. The feeding system as in claim 1 wherein the stand also has a support leg for providing the freestanding capability of the stand.

* * * * *